US012750265B2

(12) United States Patent
Sakhnini

(10) Patent No.: US 12,750,265 B2
(45) Date of Patent: Sep. 29, 2026

(54) TRANSMISSION CONFIGURATION FOR A SECOND SIGNAL BASED ON A GUARD INTERVAL LINKAGE WITH A FIRST SIGNAL

(71) Applicant: QUALCOMM Incorporated, San Diego, CA (US)

(72) Inventor: Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 442 days.

(21) Appl. No.: 18/183,565

(22) Filed: Mar. 14, 2023

(65) Prior Publication Data

US 2024/0314009 A1 Sep. 19, 2024

(51) Int. Cl.
*H04L 27/26* (2006.01)
*H04W 16/28* (2009.01)

(52) U.S. Cl.
CPC ......... *H04L 27/2605* (2013.01); *H04W 16/28* (2013.01)

(58) Field of Classification Search
CPC ........... H04L 27/2605; H04L 27/2646; H04W 16/28; H04B 7/06968
See application file for complete search history.

(56) References Cited

U.S. PATENT DOCUMENTS

2022/0417935 A1* 12/2022 Sakhnini ............... H04W 72/23
2023/0053650 A1* 2/2023 Zhang ................. H04L 27/2636
2023/0247648 A1* 8/2023 Oh ........................ H04W 48/16 370/252
2024/0163688 A1* 5/2024 Tsai .................. H04B 7/18541

* cited by examiner

*Primary Examiner* — Jae Y Lee
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a relationship between a first signal and a second signal. The UE may communicate with a wireless communication device based at least in part on using a first transmission configuration for the first signal, the first transmission configuration specifying that the first signal includes a guard interval that spans a duration and is based at least in part on a delay spread of the first signal. The UE may communicate with the wireless communication device based at least in part on using a second transmission configuration for the second signal, the second transmission configuration specifying that the second signal includes the guard interval based at least in part on the indication of the relationship. Numerous other aspects are described.

30 Claims, 10 Drawing Sheets

600

604

| | Downlink Source 1 | | Downlink Source 2 | |
|---|---|---|---|---|
| TCI State | QCL Type1 606 | QCL Source1 608 | QCL Type2 610 | QCL Source2 612 |
| 1 | Type-A' | TRS | Type-D | TRS |
| 2 | Type-A' | TRS | Type-D | CSI-RS for BM |
| 3 | Type-A' | CSI-RS for CSI | Type-D | CSI-RS for CSI |

FIG. 6A

602

614

616

| | Downlink Source 1 | | Downlink Source 2 | | Downlink Source 3 | |
|---|---|---|---|---|---|---|
| TCI State | QCL Type1 | QCL Source1 | QCL Type2 | QCL Source2 | QCL Type3 618 | QCL Source3 620 |
| 1 | Type-A | TRS | Type-D | TRS | GI | TRS |
| 2 | Type-A | TRS | Type-D | CSI-RS for BM | GI | TRS |
| 3 | Type-A | CSI-RS for CSI | Type-D | CSI-RS for CSI | GI | CSI-RS for CSI |

FIG. 6B

TRANSMISSION CONFIGURATION FOR A SECOND SIGNAL BASED ON A GUARD INTERVAL LINKAGE WITH A FIRST SIGNAL

FIELD OF THE DISCLOSURE

Aspects of the present disclosure generally relate to wireless communication and to techniques and apparatuses for a transmission configuration for a second signal based on a guard interval linkage with a first signal.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a UE or multiple UEs. A UE may communicate with a network node via downlink communications and uplink communications. “Downlink” (or “DL”) refers to a communication link from the network node to the UE, and “uplink” (or “UL”) refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication of a relationship between a first signal and a second signal. The method may include communicating with a wireless communication device based at least in part on using a first transmission configuration for the first signal, the first transmission configuration specifying that the first signal includes a guard interval (GI) that spans a duration and is based at least in part on a delay spread of the first signal. The method may include communicating with the wireless communication device based at least in part on using a second transmission configuration for the second signal, the second transmission configuration specifying that the second signal includes the GI based at least in part on the indication of the relationship.

Some aspects described herein relate to a method of wireless communication performed by a network node. The method may include transmitting an indication of a relationship between a first signal and a second signal. The method may include communicating with a wireless communication device based at least in part on using a first transmission configuration for the first signal, the first transmission configuration specifying that the first signal includes a GI that spans a duration and is based at least in part on a delay spread of the first signal. The method may include communicating with the wireless communication device based at least in part on using a second transmission configuration for the second signal, the second transmission configuration specifying that the second signal includes the GI based at least in part on the relationship between the first signal and the second signal.

Some aspects described herein relate to an apparatus for wireless communication at a UE. The apparatus may include a memory and one or more processors coupled to the memory. The one or more processors may be configured to cause the UE to receive an indication of a relationship between a first signal and a second signal. The one or more processors may be configured to cause the UE to communicate with a wireless communication device based at least in part on using a first transmission configuration for the first signal, the first transmission configuration specifying that the first signal includes a GI that spans a duration and is based at least in part on a delay spread of the first signal. The one or more processors may be configured to cause the UE to communicate with the wireless communication device based at least in part on using a second transmission configuration for the second signal, the second transmission configuration specifying that the second signal includes the GI based at least in part on the indication of the relationship.

Some aspects described herein relate to an apparatus for wireless communication at a network node. The apparatus may include a memory and one or more processors coupled to the memory. The one or more processors may be configured to cause the network node to transmit an indication of a relationship between a first signal and a second signal. The one or more processors may be configured to cause the network node to communicate with a wireless communication device based at least in part on using a first transmission configuration for the first signal, the first transmission configuration specifying that the first signal includes a GI that spans a duration and is based at least in part on a delay spread of the first signal. The one or more processors may be configured to cause the network node to communicate with the wireless communication device based at least in part on using a second transmission configuration for the second signal, the second transmission configuration specifying that the second signal includes the GI based at least in part on the relationship between the first signal and the second signal.

Some aspects described herein relate to a non-transitory computer-readable medium that stores a set of instructions for wireless communication by a UE. The set of instructions, when executed by one or more processors of the UE, may cause the UE to receive an indication of a relationship between a first signal and a second signal. The set of instructions, when executed by one or more processors of the UE, may cause the UE to communicate with a wireless communication device based at least in part on using a first transmission configuration for the first signal, the first transmission configuration specifying that the first signal includes a GI that spans a duration and is based at least in part on a delay spread of the first signal. The set of instructions, when executed by one or more processors of the UE, may cause the UE to communicate with the wireless communication device based at least in part on using a second transmission configuration for the second signal, the second transmission configuration specifying that the second signal includes the GI based at least in part on the indication of the relationship.

Some aspects described herein relate to a non-transitory computer-readable medium that stores a set of instructions for wireless communication by a network node. The set of instructions, when executed by one or more processors of the network node, may cause the network node to transmit an indication of a relationship between a first signal and a second signal. The set of instructions, when executed by one or more processors of the network node, may cause the network node to communicate with a wireless communication device based at least in part on using a first transmission configuration for the first signal, the first transmission configuration specifying that the first signal includes a GI that spans a duration and is based at least in part on a delay spread of the first signal. The set of instructions, when executed by one or more processors of the network node, may cause the network node to communicate with the wireless communication device based at least in part on using a second transmission configuration for the second signal, the second transmission configuration specifying that the second signal includes the GI based at least in part on the relationship between the first signal and the second signal.

Some aspects described herein relate to an apparatus for wireless communication. The apparatus may include means for receiving an indication of a relationship between a first signal and a second signal. The apparatus may include means for communicating with a wireless communication device based at least in part on using a first transmission configuration for the first signal, the first transmission configuration specifying that the first signal includes a GI that spans a duration and is based at least in part on a delay spread of the first signal. The apparatus may include means for communicating with the wireless communication device based at least in part on using a second transmission configuration for the second signal, the second transmission configuration specifying that the second signal includes the GI based at least in part on the indication of the relationship.

Some aspects described herein relate to an apparatus for wireless communication. The apparatus may include means for transmitting an indication of a relationship between a first signal and a second signal. The apparatus may include means for communicating with a wireless communication device based at least in part on using a first transmission configuration for the first signal, the first transmission configuration specifying that the first signal includes a GI that spans a duration and is based at least in part on a delay spread of the first signal. The apparatus may include means for communicating with the wireless communication device based at least in part on using a second transmission configuration for the second signal, the second transmission configuration specifying that the second signal includes the GI based at least in part on the relationship between the first signal and the second signal.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims.

Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6A and 6B are diagrams illustrating a first example and a second example of transmission configuration indicator state information, in accordance with the present disclosure.

DETAILED DESCRIPTION

Figure 1:
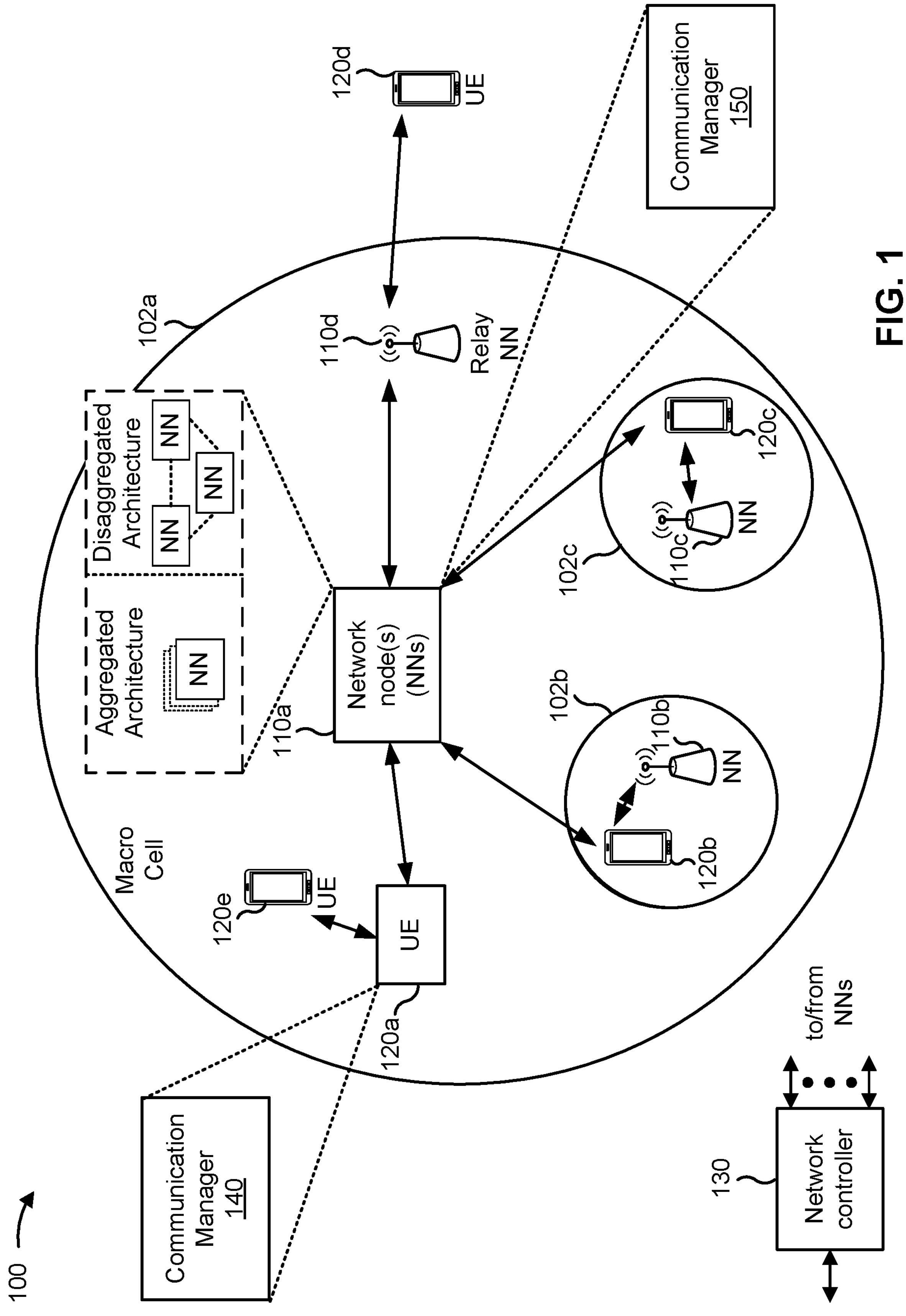
FIG. 1 is a diagram illustrating an example of a wireless network, in accordance with the present disclosure.

The demand for services provided by a wireless network continues to increase as more and more devices access the wireless network. Accordingly, the availability of communication resources (e.g., frequency resources and/or time resources) to provide these services becomes proportionally strained as the number of devices accessing the wireless network increases. Another demand involves a desire to reduce an amount of processing performed by a user equipment (UE) to preserve and/or extend a battery life at the UE. The use of quasi-co-located (QCL) properties between signals helps reduce the use of communication resources and reduce the amount of processing performed by the UE by providing information that enables the UE to reuse communication channel estimation(s) generated using a first signal for processing a second signal. A delay spread QCL property enables the UE to calculate a delay spread estimate using a first signal and to process a second signal based at least in part on using the delay spread estimate. However, knowledge of the delay spread alone may be insufficient to mitigate inter-symbol interference (ISI) in some scenarios that subsequently results in increased data recovery errors, reduced data throughput, and/or increased data transfer latencies within a wireless network.

In some aspects, a UE may receive an indication of a relationship between a first signal and a second signal, and the relationship may be based at least in part on a guard interval (GI). The UE may communicate with a wireless communication device, such as another UE or a network node, based at least in part on using a first transmission configuration that specifies, for a first signal, a GI that spans a duration, and the duration may be based at least in part on a delay spread of the first signal. Based at least in part on the indication of the relationship between the first signal and the second signal, the UE may communicate with the wireless communication device based at least in part on using a second transmission configuration for the second signal, and the second transmission configuration may include the GI with the duration (e.g., a same GI duration as included in the first transmission configuration).

Indicating a relationship between signals that is based at least in part on a GI may reduce processing at a UE by enabling the UE to reuse a GI duration and/or a delay spread estimation between QCL signals. In some aspects, the indication of the relationship may reduce the consumption of communication resources by enabling the UE to derive a duration for the GI from a delay spread (or vice versa) instead of receiving information about both the GI and the delay spread via an air interface. Reducing processing at the UE may preserve a battery life of the UE, and reducing the consumption of air interface resources may reduce overhead, increase data throughput, and/or decrease data-transfer latencies in a wireless network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUS, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHZ-7.125 GHZ) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may receive an indication of a relationship between a first signal and a second signal; communicate with a wireless communication device based at least in part on using a first transmission configuration for the first signal, the first transmission configuration specifying that the first signal includes a GI that spans a duration and is based at least in part on a delay spread of the first signal; and communicate with the wireless communication device based at least in part on using a second transmission configuration for the second signal, the second transmission configuration specifying that the second signal includes the GI based at least in part on the indication of the relationship. Additionally, or alternatively, the communication manager 140 may perform one or more other operations described herein.

In some aspects, a network node (e.g., the network node 110) may include a communication manager 150. As described in more detail elsewhere herein, the communication manager 150 may transmit an indication of a relationship between a first signal and a second signal; communicate with a wireless communication device based at least in part on using a first transmission configuration for the first signal, the first transmission configuration specifying that the first signal includes a GI that spans a duration and is based at least in part on a delay spread of the first signal; and communicate with the wireless communication device based at least in part on using a second transmission configuration for the second signal, the second transmission configuration specifying that the second signal includes the GI based at least in part on the relationship between the first signal and the second signal. Additionally, or alternatively, the communication manager 150 may perform one or more other operations described herein.

As indicated above, FIG. 1 is provided as an example. Other examples may differ from what is described with regard to FIG. 1.

Figure 2:
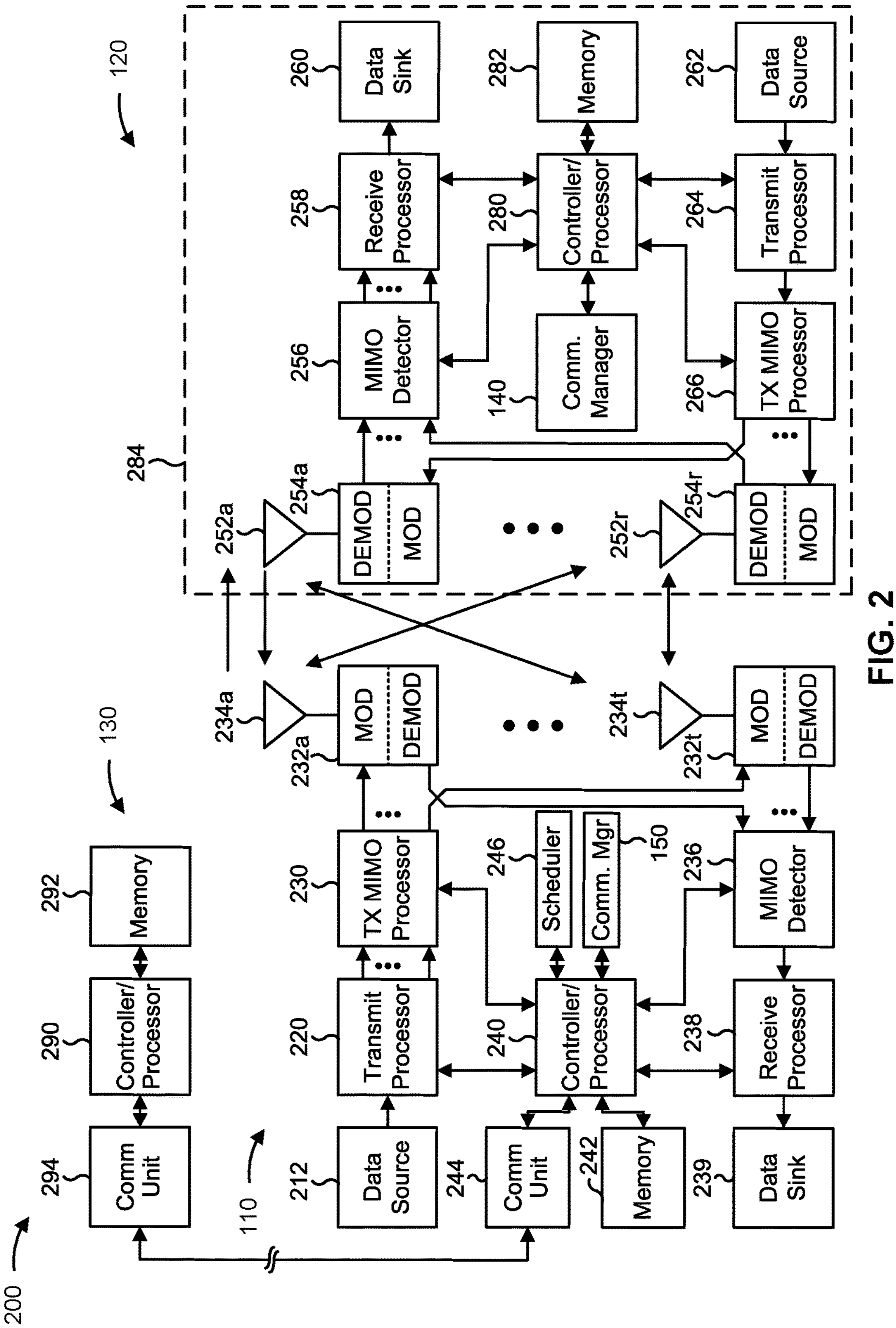
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the network node 110, the controller/processor 280 of the UE 120, and/or any other component(s) of FIG. 2 may perform one or more techniques associated with a transmission configuration for a second signal based at least in part on a guard interval linkage with a first signal, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving an indication of a relationship between a first signal and a second signal; means for communicating with a wireless communication device based at least in part on using a first transmission configuration for the first signal, the first transmission configuration specifying that the first signal includes a GI that spans a duration and is based at least in part on a delay spread of the first signal; and/or means for communicating with the wireless communication device based at least in part on using a second transmission configuration for the second signal, the second transmission configuration specifying that the second signal includes the GI based at least in part on the indication of the relationship. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting an indication of a relationship between a first signal and a second signal; means for communicating with a wireless communication device based at least in part on using a first transmission configuration for the first signal, the first transmission configuration specifying that the first signal includes a GI that spans a duration and is based at least in part on a delay spread of the first signal; and/or means for communicating with the wireless communication device based at least in part on using a second transmission configuration for the second signal, the second transmission configuration specifying that the second signal includes the GI based at least in part on the relationship between the first signal and the second signal. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
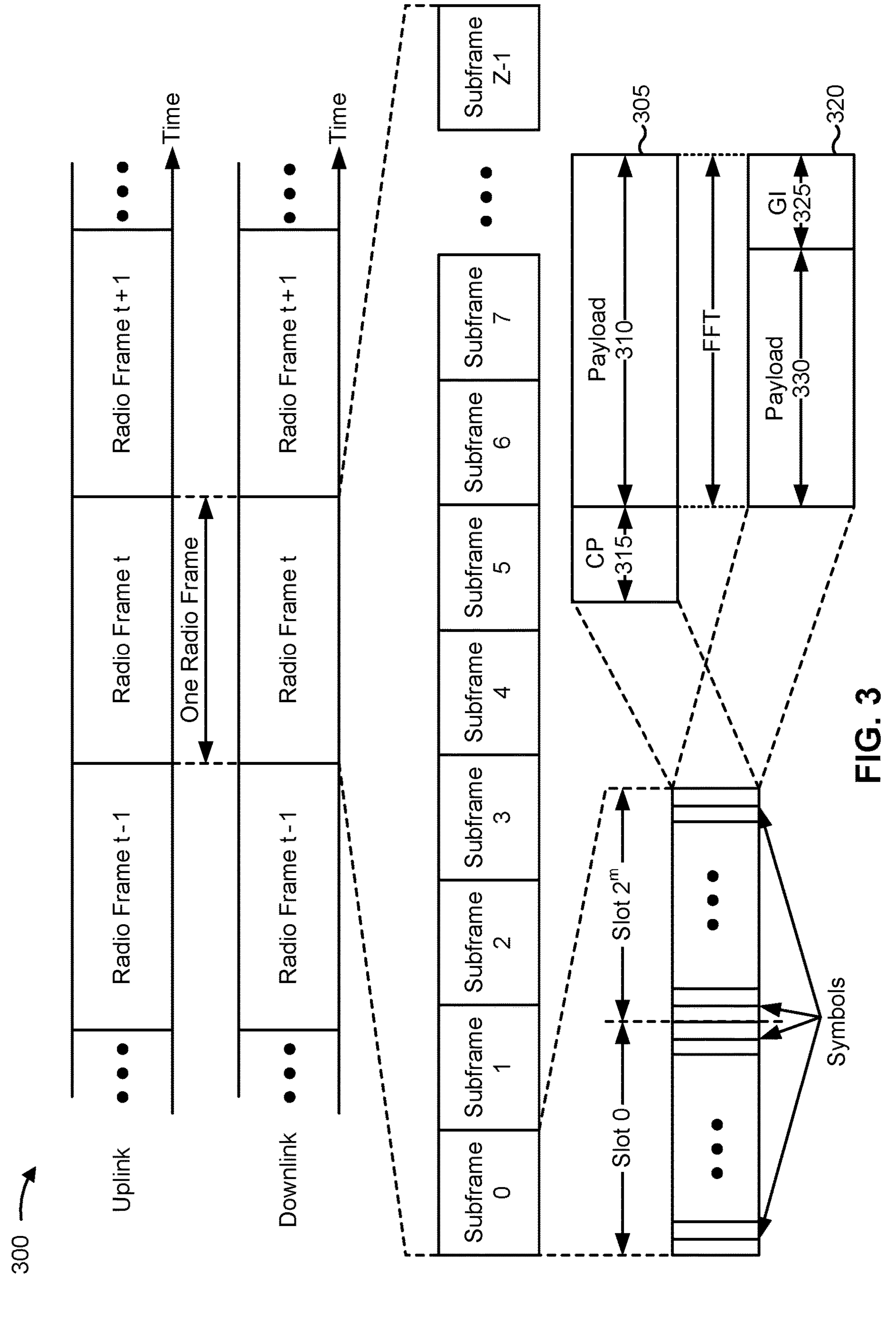
FIG. 3 is a diagram illustrating an example of a frame structure in a wireless communication network, in accordance with the present disclosure.

FIG. 3 is a diagram illustrating an example 300 of a frame structure in a wireless communication network, in accordance with the present disclosure. The frame structure shown in FIG. 3 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$) subframes (e.g., with indices of 0 through $Z-1$). Each subframe may have a predetermined duration (e.g., 1 ms) and may include a set of slots (e.g., $2^{\mu}$ slots per subframe are shown in FIG. 3, where $\mu$ is an index of a numerology used for a transmission, such as 0, 1, 2, 3, 4, or another number). Each slot may include a set of L symbols, where L is an integer, and a value of L may vary based at least in part on whether a transmitted waveform includes a cyclic prefix (CP) or a GI. For example, each slot may include fifteen symbols for a GI-based waveform (e.g., a waveform that is based at least in part on a GI), fourteen symbols for a CP-based waveform (e.g., a waveform that is based at least in part on a CP) with symbols including a normal CP (NCP)), twelve symbols (e.g., for a CP-based waveform with symbols including an extended CP (ECP)) seven symbols, or another number of symbols. In a case where the subframe includes two slots (e.g., when $\mu=1$), the subframe may include 2L symbols, where the 2L symbol periods in each subframe may be assigned indices of 0 through $2L-1$. In some aspects, a scheduling unit for the FDD may be frame-based, subframe-based, slot-based, mini-slot based, or symbol-based.

In some aspects, as shown by reference number 305, the frame structure may be associated with a CP-based waveform. For the CP-based waveform, each CP symbol (e.g., a symbol that uses a CP) may include a payload 310 and a CP 315. The CP 315 is transmitted at the start of each CP symbol to provide protection against inter-symbol interference caused by a delay spread as a result of wave propagation, among other reasons. To illustrate, "delay spread" may refer to a difference between a first arrival time of an earliest signal ray (e.g., a first received signal ray) of a multi-path signal and a second arrival time of a latest signal ray (e.g., a last received signal ray) of the multi-path signal. The CP 315 may include a copy of an end portion of the payload 310, and may act as a guard period between adjacent CP symbols by providing a time window for the delay spread components (e.g., signal rays) belonging to a previous CP symbol to arrive before the start of the next CP symbol's payload.

For the CP-based waveform shown by reference number 305, a time duration of the payload 310 may be equal to one cycle of a sine wave with a frequency equal to the subcarrier spacing (SCS). In terms of sample size, the payload 310 may have a length of M samples (e.g., based at least in part on a sampling rate, and where M is a first integer), and a length of the CP symbol as a whole may equal the M samples of the payload 310 plus N samples (e.g., based at least in part on the sampling rate, and where N is a second integer) included in the CP 315. In some aspects, demodulating a CP symbol may include processing the M samples of the payload 310 based at least in part on using a discrete Fourier transform (DFT). Accordingly, a relationship between the M samples and the payload 310 may be proportional, in that as the payload 310 increases or decreases, M may also increase or decrease (e.g., for a same sampling rate and a same CP symbol duration). The length of the CP 315 (and thus the number of samples within the CP) may vary according to implementation and/or a location of the corresponding CP symbol within a slot. In some aspects, for CP-base waveforms, the size of the slots in a subframe may be of unequal length, with one slot in each half subframe, which includes a long symbol (e.g., which includes an NCP plus padding), being of greater duration than the remaining slots in the half subframe. In some aspects, a slot of a CP-based waveform utilizing the NCP contains fourteen symbols, while a slot of a CP-based waveform utilizing the ECP contains twelve symbols.

In some aspects, and as shown by reference number 320, the frame structure may be associated with a GI-based waveform. For the GI-based waveform, each GI symbol (e.g., a symbol that is based at least in part on a GI) may include a payload 330 and a GI 325. The GI 325 may be transmitted at the start or end of each GI symbol and, in a similar manner as the CP 315, may provide protection against inter-symbol interference caused by a delay spread as a result of wave propagation, among other reasons. However, unlike the CP 315, the GI 325 may not include a copy of a portion of the payload 330 belonging to the corresponding GI symbol. Instead, the GI 325 may be blank and/or may include all zero information bits (and thus be useful, in addition to serving as a guard between successive payloads, for measuring noise in the channel or the like), and/or may include reference signaling or other non-payload signaling.

Moreover, and unlike the CP-based waveform, for the GI-based waveform, a time duration of the GI symbol as a whole is equal to one cycle of a sine wave with a frequency equal to the SCS. That is, in terms of sample size and as shown by FIG. 3, the entire GI symbol (e.g., payload 330 plus GI 325) may also have a length of M samples (e.g., based at least in part on the sampling rate described above). In some aspects, demodulating a GI symbol may include processing the M samples of the payload 330 and the GI 325 based at least in part on using a DFT. Accordingly, the M samples of the GI symbol may remain fixed as the payload 330 increases or decreases and the GI 325 decreases or increases, respectively (e.g., for a same sampling rate and a same GI symbol duration). A slot associated with the GI-based waveform may contain more symbols (e.g., GI symbols) than a slot associated with a CP-based waveform. More particularly, in some aspects, a slot associated with a GI-based waveform may include fifteen symbols. As a result, within a given half subframe, slot boundaries for CP-based waveforms may not align with slot boundaries for GI-based waveforms.

As indicated above, FIG. 3 is provided as an example. Other examples may differ from what is described with respect to FIG. 3.

Figure 4:
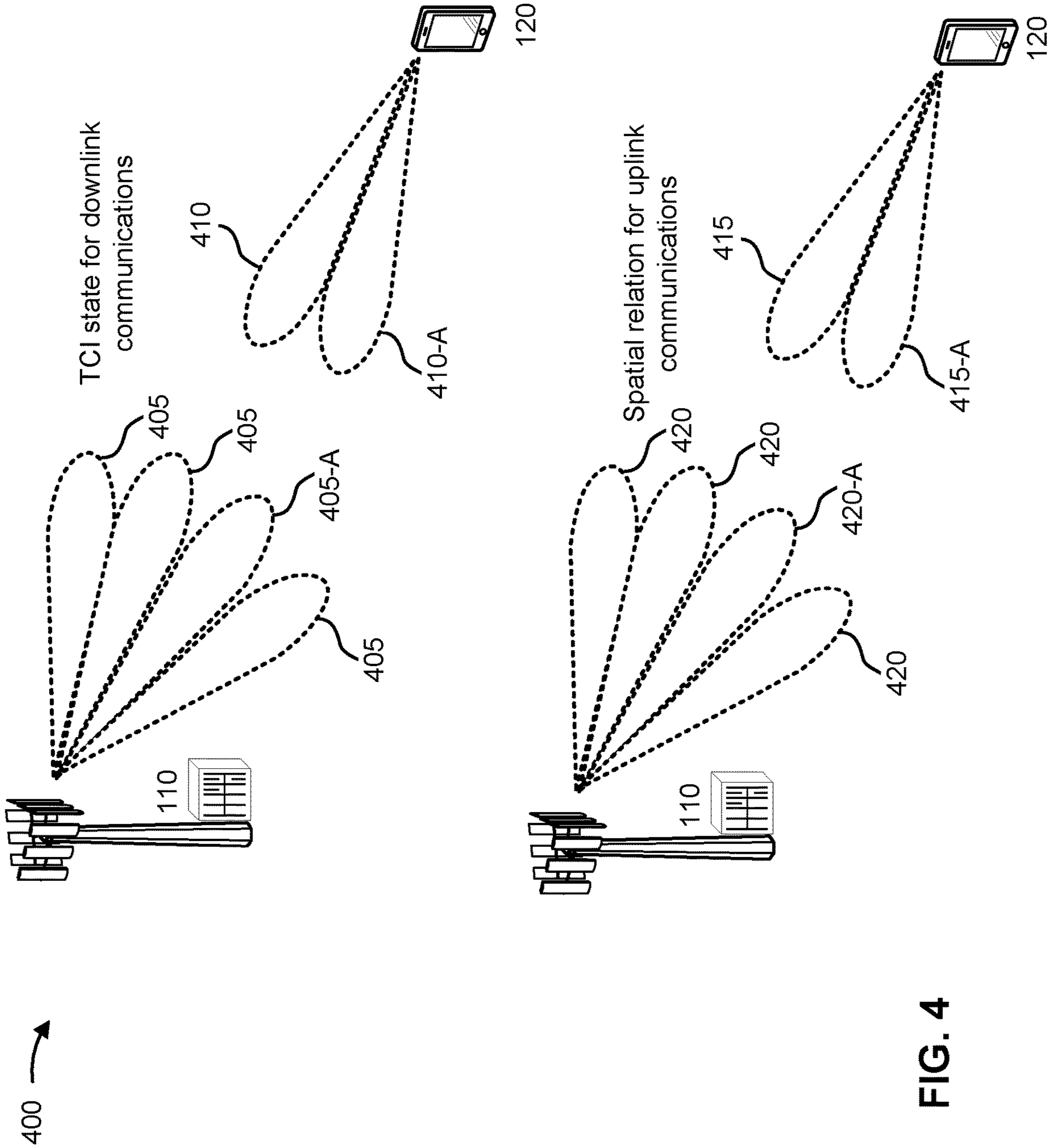
FIG. 4 is a diagram illustrating an example of using beams for communications between a network node and a UE, in accordance with the present disclosure.

FIG. 4 is a diagram illustrating an example 400 of using beams for communications between a network node and a UE, in accordance with the present disclosure. As shown in FIG. 4, a network node 110 and a UE 120 may communicate with one another based at least in part on using one or more beams.

The network node 110 may transmit to UEs 120 located within a coverage area of the network node 110. The network node 110 and the UE 120 may be configured for beamformed communications, where the network node 110 may transmit in the direction of the UE 120 using a directional network node (NN) transmit beam, and the UE 120 may receive the transmission using a directional UE receive beam. Each NN transmit beam may have an associated beam ID, beam direction, or beam symbols, among other examples. The network node 110 may transmit downlink communications via one or more NN transmit beams 405.

The UE 120 may attempt to receive downlink transmissions via one or more UE receive beams 410, which may be configured using different beamforming parameters at receive circuitry of the UE 120. The UE 120 may identify a particular NN transmit beam 405, shown as NN transmit beam 305-A, and a particular UE receive beam 410, shown as UE receive beam 410-A, that provide relatively favorable performance (for example, that have a best channel quality of the different measured combinations of NN transmit beams 405 and UE receive beams 410). In some examples, the UE 120 may transmit an indication of which NN transmit beam 405 is identified by the UE 120 as a preferred NN transmit beam, which the network node 110 may select for transmissions to the UE 120. The UE 120 may thus attain and maintain a beam pair link (BPL) with the network node 110 for downlink communications (for example, a combination of the NN transmit beam 405-A and the UE receive beam 410-A), which may be further refined and maintained in accordance with one or more established beam refinement procedures.

A downlink beam, such as an NN transmit beam 405 or a UE receive beam 410, may be associated with a transmission configuration indication (TCI) state. A TCI state may indicate a directionality or a characteristic of the downlink beam, such as one or more QCL properties of the downlink beam. Two signals may be QCL signals (and/or two antenna ports used to transmit each respective signal may be QCL antenna ports) based at least in part on the two signals having a same and/or commensurate (e.g., within a range of values and/or within a threshold) communication channel property, such as a same and/or commensurate QCL property. Accordingly, for a first signal and a second signal that are QCL, an estimation of a communication channel property that is calculated and/or derived using the first signal may be used in processing the second signal. That is, the first signal may be a QCL source for the second signal based at least in part on a communication channel property being estimated using the first signal, and being used to transmit and/or receive the second signal. For example, a UE may select a transmission configuration and/or configure hardware based at least in part on the estimated communication channel property as described below. Examples of QCL properties may include a Doppler shift, a Doppler spread, an average delay, a delay spread, and/or spatial receive parameters, among other examples.

In some examples, each NN transmit beam 405 may be associated with a synchronization signal block (SSB), and the UE 120 may indicate a preferred NN transmit beam 405 by transmitting uplink transmissions in resources of the SSB that are associated with the preferred NN transmit beam 405. A particular SSB may have an associated TCI state (for example, for an antenna port or for beamforming). The network node 110 may, in some examples, indicate a downlink NN transmit beam 405 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based at least in part on the network node 110 indicating an NN transmit beam 405 via a TCI indication.

The network node 110 may maintain a set of activated TCI states for downlink shared channel transmissions and a set of activated TCI states for downlink control channel transmissions. The set of activated TCI states for downlink shared channel transmissions may correspond to beams that the network node 110 uses for downlink transmission on a physical downlink shared channel (PDSCH). The set of activated TCI states for downlink control channel communications may correspond to beams that the network node 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the network node 110 using a directional UE transmit beam, and the network node 110 may receive the transmission using a directional NN receive beam. Each UE transmit beam may have an associated beam ID, beam direction, or beam symbols, among other examples. The UE 120 may transmit uplink communications via one or more UE transmit beams 415.

The network node 110 may receive uplink transmissions via one or more NN receive beams 420 (e.g., network node receive beams). The network node 110 may identify a particular UE transmit beam 415, shown as UE transmit beam 415-A, and a particular NN receive beam 420, shown as NN receive beam 420-A, that provide relatively favorable performance (for example, that have a best channel quality of the different measured combinations of UE transmit beams 415 and NN receive beams 420). In some examples, the network node 110 may transmit an indication of which UE transmit beam 415 is identified by the network node 110 as a preferred UE transmit beam, which the network node 110 may select for transmissions from the UE 120. The UE 120 and the network node 110 may thus attain and maintain a BPL for uplink communications (for example, a combination of the UE transmit beam 415-A and the NN receive beam 420-A), which may be further refined and maintained in accordance with one or more established beam refinement procedures. An uplink beam, such as a UE transmit beam 415 or an NN receive beam 420, may be associated with a spatial relation. A spatial relation may indicate a directionality or a characteristic of the uplink beam, similar to one or more QCL properties, as described above.

The demand for services provided by a wireless network continues to increase as more and more devices access the wireless network. Accordingly, the availability of communication resources (e.g., frequency resources and/or time resources) to provide these services becomes proportionally strained as the number of devices accessing the wireless network increases. Another demand involves a desire to reduce an amount of processing performed by a UE to preserve and/or extend a battery life at the UE. The use of QCL properties and/or TCI state information helps reduce the use of communication resources and reduce the amount of processing performed by the UE by providing information that enables the UE to reuse communication channel estimation(s) generated using a first signal for processing a second signal. One such example includes the indication of a delay spread QCL property that enables the UE to calculate a delay spread estimate using a first signal and process a second signal based at least in part on using the delay spread estimate. Although the UE may mitigate ISI by adjusting a duration CP and/or GI based at least in part on the delay spread, knowledge of the delay spread alone may be insufficient to mitigate ISI in some scenarios that subsequently results in increased data recovery errors, reduced data throughput, and/or increased data transfer latencies within a wireless network.

To illustrate, in transmit receive point (TRP) communications, multiple TRPs (mTRPs) may communicate with the same UE in a coordinated manner (e.g., using coordinated multipoint transmissions). Alternatively, or additionally, the mTRPs may transmit communications (e.g., the same communication or different communications) in the same transmission time interval (TTI) (e.g., a slot, a mini-slot, a subframe, or a symbol) or different TTIs using different QCL relationships (e.g., different spatial parameters, different TCI states, different precoding parameters, and/or different beamforming parameters). In some aspects, the UE may observe a respective, and different, delay spread for each TRP. Accordingly, determining a duration for a CP and/or GI based at least in part on a delay spread for an mTRP communication, such as a joint mTRP communication, may result in multiple, different durations that increase an amount of processing at the UE and, subsequently, may consume battery resources. Further, transmitting an indication of the duration for the CP and/or GI in addition to the delay spread may consume additional communication resources that could be used for other purposes. That is, transmitting the indication of the duration for the CP and/or GI in addition to the delay spread may be considered overhead that results in reduced data throughput and/or increased data-transfer latencies in a wireless network.

Some techniques and apparatuses described herein provide a relationship between signals. In some aspects, a UE may receive an indication of a relationship between a first signal and a second signal. The relationship may be based at least in part on a GI. As one example, the UE may receive an indication that the first signal and the second signal have a GI relationship (e.g., a same GI duration). As another example, the UE may receive an indication that the first signal and the second signal have a delay spread relationship. As described above with regard to FIG. 3, the duration of a GI may be based at least in part on a delay spread. In some aspects, the UE may communicate with a wireless communication device, such as another UE or a network node, based at least in part on using a first transmission configuration for the first signal. In some aspects, the first transmission configuration may include a GI that spans a duration for the first signal, and the duration may be based at least in part on a delay spread of the first signal. Based at least in part on the indication of the relationship between the first signal and the second signal, the UE may communicate with the wireless communication device based at least in part on using a second transmission configuration for the second signal, and the second transmission configuration may include the GI with the duration (e.g., a same GI duration as included in the first transmission configuration).

Indicating a transmission configuration for a second signal based at least in part on a relationship (e.g., a GI linkage) with a first signal may reduce processing at a UE by enabling the UE to reuse a GI duration and/or a delay spread estimation between QCL signals. Indicating a relationship that is based at least in part on a GI duration, instead of a CP duration, may also reduce processing at the UE based at least in part on GI processing using a fixed number of DFT samples relative to CP processing using a variable number of DFT samples as described above. In some aspects, the indication of the relationship may reduce the consumption of communication resources by enabling the UE to derive a duration for the GI from a delay spread (or vice versa) instead of receiving information about both the GI and the delay spread via an air interface. Alternatively or additionally, the UE may be configured (e.g., via TCI state information) to process mTRP communications that include multiple different delay spreads using a single GI duration, which may also reduce processing at the UE. Reducing processing at the UE may preserve a battery life of the UE, and reducing the consumption of air interface resource may reduce overhead, increase data throughput and/or decrease data-transfer latencies in a wireless network.

As indicated above, FIG. 4 is provided as an example. Other examples may differ from what is described with respect to FIG. 4.

Figure 5:
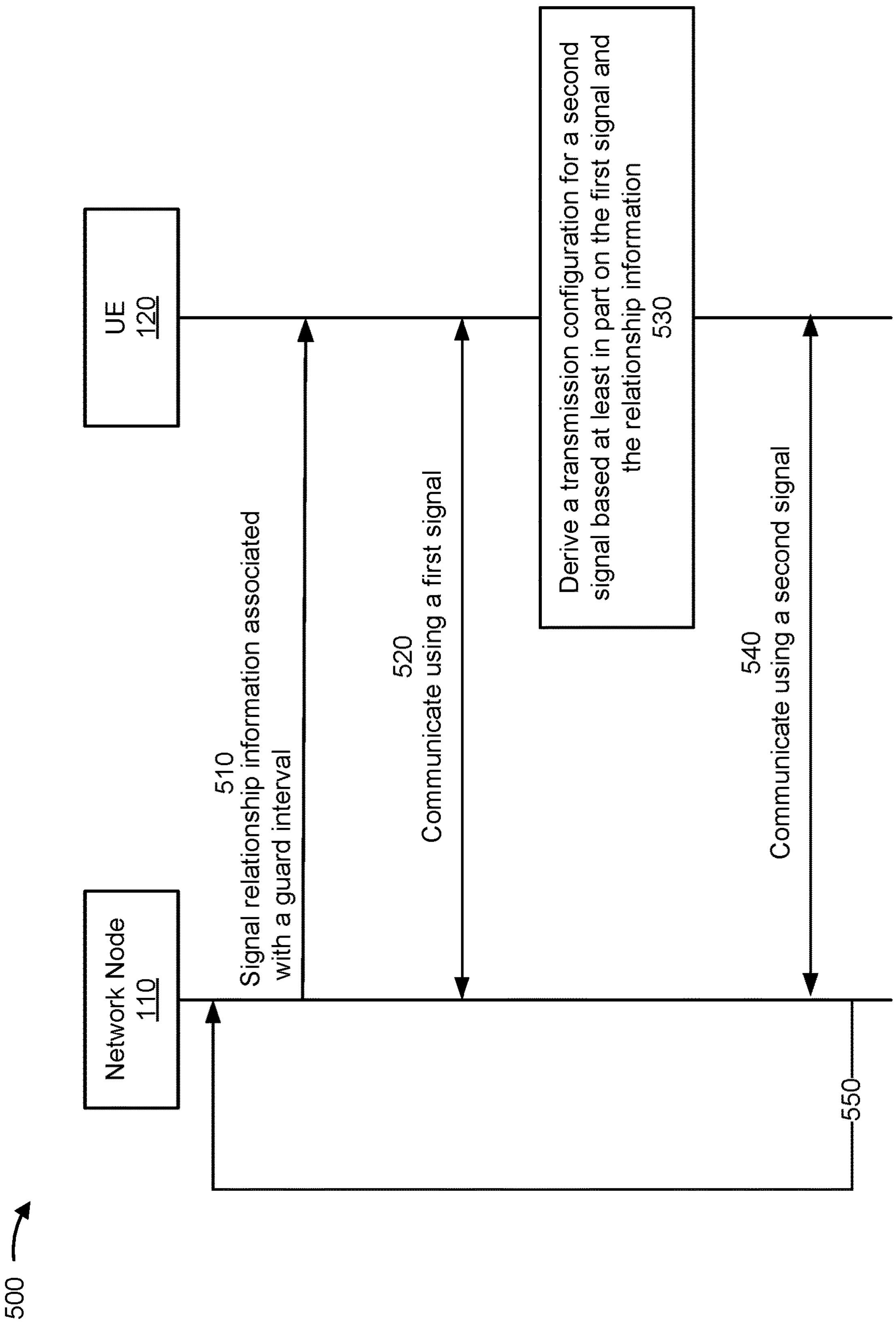
FIG. 5 is a diagram illustrating an example of a wireless communication process between a network node and a UE, in accordance with the present disclosure.

FIG. 5 is a diagram illustrating an example 500 of a wireless communication process between a network node (e.g., the network node 110) and a UE (e.g., the UE 120), in accordance with the present disclosure.

As shown by reference number 510, a network node 110 may transmit, and a UE 120 may receive, an indication of a signal relationship that is based at least in part on a GI. The signal relationship may be between a first signal and a second signal, and the first signal and second signal may be any combination of a downlink signal, an uplink signal, and/or a sidelink signal. As non-limiting examples, the first signal and the second signal may be a downlink signal and an uplink signal, a downlink signal and a sidelink signal, and/or a downlink signal and a downlink signal.

In some aspects, the network node 110 may implicitly indicate the signal relationship. To illustrate, the network node 110 may transmit and/or indicate a first transmission configuration that is associated with transmission and/or reception of the first signal in any combination of downlink control information (DCI), RRC signaling, and/or a medium access control (MAC) control element (CE). To illustrate, the network node 110 may indicate (e.g., in DCI and/or a MAC CE) a first signal relationship that is associated with a PDCCH before indicating a control resource set (CORESET) and/or a second signal relationship that is associated with a PDSCH (e.g., in grant DCI). The first transmission configuration may specify a GI and/or a duration of the GI. Alternatively, or additionally, the network node 110 may transmit and/or indicate a second transmission configuration that is associated with transmission and/or reception of the second signal. In a similar manner as associated with indicating the first transmission configuration, the network node 110 may indicate the second transmission configuration in any combination of DCI, RRC signaling, and/or a MAC CE, and the second transmission configuration may specify the same GI and/or the same duration of the GI that is included in the first transmission configuration. In some aspects, the network node 110 may implicitly indicate a signal relationship between the first signal and the second signal by specifying a same GI and/or duration of the GI in both transmission configurations. Accordingly, the UE 120 may analyze the first transmission configuration and the second transmission configuration and determine that both transmission configurations specify the (same) GI and/or the (same) duration of the GI. Based at least in part on determining that both transmission configurations specify the same GI and/or same duration of the GI, the UE 120 may determine that there is a signal relationship between the first signal and the second signal, such as a QCL relationship (e.g., a delay spread QCL relationship). Thus, the network node 110 may implicitly indicate the QCL relationship using the transmission configuration information and, in some aspects, without explicitly indicating the QCL relationship in TCI state information.

Alternatively, or additionally, the network node 110 may explicitly indicate a signal relationship between the first signal and the second signal. For instance, the network node 110 may transmit TCI state information that specifies a QCL relationship between the first signal and the second signal, such as by indicating that the first signal is a GI QCL source for determining a duration of a GI for the second signal, as described below. Accordingly, the UE 120 may measure and/or estimate a GI for the second signal based at least in part on measuring and/or estimating a GI using the first signal. To illustrate, the UE 120 may estimate a delay spread based at least in part on the QCL source (e.g., the first signal), and calculate a GI using the delay spread (e.g., by selecting a GI that has a same duration as the delay spread and/or a duration longer than the delay spread).

In some aspects, the network node 110 may indicate, in the TCI state information, a GI relationship and/or a QCL property as described below with regard to FIGS. 6A and 6B. As one example, the network node 110 may specify a QCL type that includes and/or indicates a GI QCL property. That is, a TCI state may indicate a GI QCL property. To illustrate, the network node 110 may specify, in a TCI state, a QCL Type-A' relationship between the first signal and the second signal, and the QCL Type-A' relationship may specify that a relationship between the first signal and the second signal includes a Doppler shift QCL property, a Doppler spread Doppler shift QCL property, an average delay Doppler shift QCL property, a delay spread Doppler shift QCL property, and a GI QCL property. Accordingly, the UE 120 may determine that the first signal and the second signal use a same GI duration based at least in part on the indicated QCL type. While the QCL Type-A' is described as indicating a GI QCL property (in addition to others), alternate or additional QCL types may be defined and/or modified to indicate the GI QCL property. Accordingly, a QCL type may indicate a GI QCL property in combination with one or more other QCL properties, or alone.

In some aspects, the network node 110 may implicitly indicate to use the associated GI duration for an entirety of symbols included and/or carried by the second signal as described with regard to FIG. 6A. To illustrate, the network node 110 may indicate, in TCI state information, a QCL type that includes the GI QCL property. Based at least in part on indicating the QCL type that includes the GI QCL property, the network node 110 may implicitly indicate to use the TCI state information and/or the associated GI duration for one or more symbols that carry a DMRS and/or one or more symbols that do not carry the DMRS. Alternatively, or additionally, the network node may indicate, in TCI state information, a QCL type that excludes the GI QCL property. Based at least in part on indicating the QCL type that excludes the GI QCL property, the network node 110 may implicitly indicate to use the TCI state information and/or an associated GI duration only for symbols that carry the DMRS (e.g., and not for symbols that do not carry the DMRS).

In some aspects, a QCL source for a delay spread may be different than a QCL source for a GI. To illustrate, in an mTRP communication, the UE 120 may observe a different delay spread for each TRP of the mTRPs. To mitigate ISI, the mTRP communication may be configured to use a GI that is based at least in part on a GI associated with a maximum delay spread of the mTRPs. Accordingly, the UE 120 may communicate the mTRP communication with each TRP based at least in part on using the same GI that is associated with the maximum delay spread. For a particular link and/or TRP, a delay spread may be smaller than the maximum delay spread associated with the GI. That is, the delay spread may be based at least in part on a first TRP associated with a link and the GI may be associated with a second TRP. Accordingly, indicating a QCL source for a delay spread separately from a QCL source for a GI duration and/or GI length enables the network node 110 to configure the UE 120 to communicate with mTRPs using a single GI that is based at least in part on a maximum delay spread associated with the mTRPs. As described below with regard to FIG. 6B, the network node 110 may indicate a first QCL source for measuring a delay spread, and a second QCL source for measuring a duration of a GI.

As shown by reference number 520, the network node 110 and the UE 120 may communicate with one another based at least in part on a first signal. In some aspects, the UE 120 may communicate with the network node 110 based at least in part on a first transmission configuration associated with the first signal. For example, the network node 110 may transmit, and the UE 120 may receive, the first signal based at least in part on using a first transmission configuration. To illustrate, the UE 120 may use the first transmission configuration to configure an antenna port and/or receiver hardware to receive the first signal, such as configuring the antenna port and/or receiver hardware based at least in part on a receive beam indicated by the first transmission configuration. In some aspects, the UE 120 may demodulate and/or decode payload data based at least in part on a GI duration indicated by the first transmission configuration. Alternatively, or additionally, the UE 120 may transmit the first signal using the first transmission configuration to generate the first signal, such as by including a GI with a duration (e.g., specified by the first transmission configuration) in each symbol. In some aspects, the UE 120 may transmit the first signal by configuring the antenna port and/or transmitter hardware using the first transmission configuration, such as by configuring the antenna port and/or transmitter based at least in part on a transmit beam specified by the transmission configuration.

As shown by reference number 530, the UE 120 may derive at least part of a second transmission configuration for a second signal based at least in part on the first signal and the relationship. As one example, the UE 120 may measure, estimate, and/or calculate a delay spread based at least in part on receiving the first signal. In some aspects, and as further described above, the UE 120 may process the second signal using the delay spread based at least in part on the relationship. As one example, the UE 120 may use the delay spread that is calculated and/or estimated using the first signal (e.g., a tracking reference signal (TRS)) in a Layer 1 processing procedure associated with the second signal (e.g., PDSCH).

As shown by reference number 540, the network node 110 and the UE 120 may communicate with one another based at least in part on the second signal and the second transmission configuration. Communicating with one another may include transmission of one or more uplink signals by the UE 120 and/or reception of the one or more uplink signals by the network node 110. Alternatively, or additionally, communicating with one another may include transmission of one or more downlink signals by the network node 110 and/or reception of the one or more downlink signals by the UE 120. Each uplink signal may be associated with a respective uplink channel (e.g., a physical uplink control channel (PUCCH) and/or a physical uplink shared channel (PUSCH)) and/or each downlink signal may be associated with a respective downlink channel (e.g., a PDCCH and/or a PDSCH). In some aspects, the UE 120 configure a first antenna port and/or receiver hardware to receive the second signal based at least in part on the second transmission configuration. Alternatively, or additionally, the UE 120 may configure a second antenna port and/or transmitter hardware to transmit the second signal.

The UE 120 may receive the second transmission configuration from the network node 110 as described above, and the second transmission configuration may explicitly specify that the second signal includes the GI associated with the first signal. Alternatively, or additionally, the UE 120 may derive at least a portion of the second transmission configuration (e.g., a GI duration). In some aspects, the UE 120 may communicate with the network node 110 based at least in part on using a GI for an entirety of symbols included in the second signal (e.g., for transmitting the entirety of the symbols and/or for recovering data from the entirety of the symbols). As one example, the UE 120 may apply the GI to the entirety of symbols based at least in part on an indication received via TCI state information as described below with regard to FIG. 6A. The entirety of the symbols may include at least a first symbol that carries a DMRS and/or at least a second signal that does not carry a DMRS. Alternatively, or additionally, the UE 120 may apply the GI only to symbols that carry a DMRS.

As shown by reference number 550, the network node 110 may transmit, and the UE 120 may receive, an update to the signal relationship, a configuration associated with the signal relationship, and/or an update to the transmission configuration, such as an update that is associated with a GI duration and/or a delay spread. To illustrate, the network node 110 may transmit updated TCI state information that specifies a first modification to the delay spread and/or a second modification to the duration of the GI. For instance, the network node 110 may update a first QCL source associated with the GI and/or a second QCL source associated with the delay spread. Alternatively, or additionally, the network node 110 may transmit an update to a transmission configuration, such as by indicating an update GI duration for the first transmission configuration and/or the second transmission configuration.

Based at least in part on the signal relationship between the first signal and the second signal, the UE 120 may communicate with the network node 110 (and/or another wireless communication device) based at least in part on using the updated TCI state information and/or an updated transmission configuration. For instance, the UE 120 may gencrate an updated delay spread estimate based at least in part on the updated TCI state information, and use the updated delay spread estimate in Layer 1 processing associated with the second signal. Alternatively, or additionally, the UE 120 may use an updated GI duration associated with the first signal for processing the second signal (e.g., for transmitting and/or receiving communication(s) using the second signal). In some aspects, the updated TCI state information may indicate a change to which symbols are associated with the signal relationship. For instance, based at least in part on the updated TCI state information, the UE 120 may use an updated GI duration for each symbol in an entirety of symbols carried by the second signal, including a first symbol in the entirety that carries a DMRS and/or a second symbol in the entirety that does not carry a DMRS. Alternatively, or additionally, the UE 120 may use the updated GI duration only for symbols that carry the DMRS.

In some aspects, the network node 110 may indicate an update to a single TCI state, and the UE 120 may derive, estimate, and/or calculate a modified duration for a GI that is subsequently used for multiple signals. For instance, the single updated TCI state may indicate a different QCL source for the first signal, and the UE 120 may measure a delay spread and calculate a modified duration to the GI (e.g., using the new QCL source). As another example, the (single) updated TCI state may indicate a different and/or modified GI duration for the first signal. The UE 120 may then use the modified GI duration for transmission of one or more uplink signals and/or reception of the one or more downlink signals. As described above, each uplink signal may be associated with a respective uplink channel, and/or each downlink signal may be associated with a respective downlink channel.

In some aspects, the network node 110 may transmit an indication of an update to the duration of the GI (e.g., in DCI, RRC signaling, and/or a MAC CE). That is, the network node 110 may transmit an indication of an updated GI duration using a different communication mechanism than TCI state information, such as by transmitting the updated GI duration as part of an update to the first transmission configuration. Accordingly, and based at least in part on the signal relationship, the UE 120 may communicate with the network node 110 (and/or another wireless communication device) via the second signal based at least in part on using the modification to the GI duration in one or more symbols carried by the second signal. In some aspects, and based at least in part on receiving the updated GI duration in a different communication mechanism than TCI state information, the UE 120 may autonomously update TCI state information with the updated GI duration. Alternatively, or additionally, the UE 230 may indicate the updated TCI state information (e.g., to the network node 110 and/or another wireless communication device), such as by transmitting an update to the duration of the GI.

Indicating a transmission configuration for a second signal based at least in part on a relationship (e.g., a GI linkage) with a first signal may reduce processing at a UE by enabling the UE to reuse a GI duration and/or a delay spread estimation between QCL signals. In some aspects, the indication of the relationship may reduce the consumption of communication resources by enabling the UE to derive a duration for the GI from a delay spread (or vice versa) instead of receiving information about both the GI and the delay spread via an air interface. Reducing processing at the UE may preserve a battery life of the UE, and reducing the consumption of air interface resource may reduce overhead, increase data throughput and/or decrease data-transfer latencies in a wireless network.

As indicated above, FIG. 5 is provided as an example. Other examples may differ from what is described with regard to FIG. 5.

FIGS. 6A and 6B are diagrams illustrating a first example 600 and a second example 602 of TCI state information, in accordance with the present disclosure. In some aspects, a network node (e.g., a network node 110) may transmit TCI state information to indicate QCL relationship information. As one example, the network node may transmit the TCI state information in DCI.

The first example 600 of FIG. 6A includes TCI state information that indicates a GI QCL property based at least in part on indicating a QCL type as described above. To illustrate, and as shown by reference number 604, the first example 600 includes three TCI states for a first downlink source (shown as Downlink Source 1) and a second downlink source (shown as Downlink Source 2). Column 606 of the first downlink source specifies a respective QCL type for each TCI state and column 608 of the first downlink source specifies a respective reference signal. To illustrate, for TCI state “1”, the column 606 specifies a QCL type of QCL Type-A' and the column 608 specifies a TRS as a QCL source. In some aspects, the QCL Type-A' may include a GI QCL property as described above. Accordingly, selection of TCI state “1” for the first downlink source indicates to use, as a source signal, the TRS to measure and/or estimate at least a GI and/or GI duration, and that the estimated GI and/or GI duration may be applied and/or used for a second (QCL) signal. In the first example 600, the indication and/or selection of a QCL type that includes a GI QCL property (e.g., QCL Type-A') may alternatively or additionally specify to use the GI (e.g., generated using the first downlink signal) for an entirety of symbols included and/or carried by the second (QCL) signal as described above. That is, selection of a QCL type that includes a GI QCL property may indicate to use the estimated GI and/or estimated GI duration for symbols that carry DMRS and/or for symbols that do not carry DMRS.

Column 610 of the second downlink source also specifies a respective QCL type for each TCI state and column 612 of the second downlink source specifies a respective reference signal. For TCI state “1” of the second downlink source, the column 610 specifies a QCL type of QCL Type-D and the column 612 specifies a TRS as a QCL source. In some aspects, the QCL Type-D may exclude and/or lack a GI QCL property. Accordingly, selection of TCI state “1” for the second downlink source may indicate to use, as a source signal, the TRS as a reference signal to measure and/or estimate at least a GI and/or GI duration, and that the estimated GI and/or estimated GI duration may be applied and/or used for a second (QCL) signal. The indication and/or selection of a QCL type that excludes and/or lacks the GI QCL property (e.g., QCL Type-D) may alternatively or additionally specify to use the GI only for symbols that include and/or carry a DMRS.

The second example 602 of FIG. 6B includes TCI state information that specifies a GI source separately from a delay spread source, where the GI source may be used to measure, calculate, and/or estimate a GI duration. To illustrate, and as shown by reference number 614, the TCI state information of the second example 602 includes three TCI states for a first downlink source (shown as Downlink Source 1), a second downlink source (shown as Downlink Source 2), and a third downlink source (shown as Downlink Source 3). In some aspects, the TCI state information may indicate that the first downlink source and/or the second downlink source may be used as a source for measuring, calculating, and/or estimating delay spread, such as by specifying a QCL type that includes a delay spread QCL property. As shown by reference number 616, the TCI state information may specify a separate GI downlink source (e.g., separate from a delay spread source), and the GI downlink source may be used for measuring, calculating, and/or estimating a GI duration.

For instance, and as shown by FIG. 6B, the first downlink source and the second downlink source may specify a respective QCL type and a respective QCL source for each TCI state. In some aspects, a respective QCL type of either the first downlink source or the second downlink source may specify a delay spread QCL property. Alternatively, or additionally, the respective QCL type of either the first downlink source or the second downlink source may exclude and/or may not specify a GI QCL property. In some aspects, and as shown by reference number 616, the TCI state information may specify a separate QCL source (e.g., a GI QCL source that is separate from a delay spread QCL source) for measuring and/or estimating a GI. While the example 602 shows the TCI state information including a GI QCL source as one of three QCL sources, other examples of TCI state information may only specify the GI QCL source information and/or may specify the GI QCL source information in combination with one or more other QCL sources that are associated with any other types of QCL properties.

The third downlink source includes a column 618 that specifies a GI QCL type (e.g., only a GI QCL property) and a column 620 that specifies a QCL source. Accordingly, selection of TCI state “1” for the third downlink source indicates to use, as a QCL source, the TRS to measure and/or estimate a GI and/or GI duration, and that the estimated GI and/or estimated GI duration may be applied and/or used for a second (QCL) signal.

As indicated above, FIGS. 6A and 6B are provided as an example. Other examples may differ from what is described with regard to FIGS. 6A and 6B.

Figure 7:
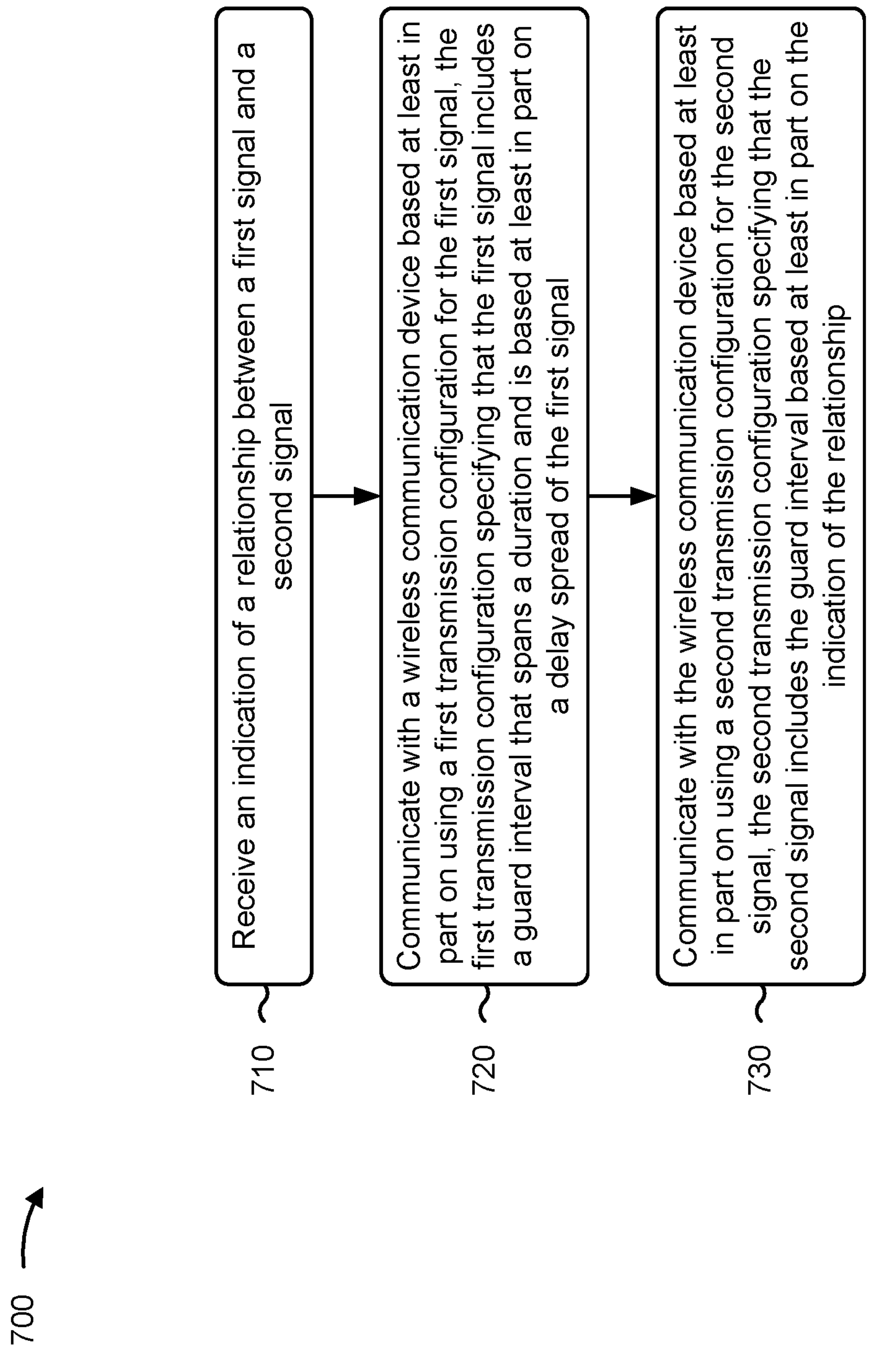
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with a transmission configuration for a second signal based at least in part on a relationship (e.g., a GI linkage) with a first signal.

As shown in FIG. 7, in some aspects, process 700 may include receiving an indication of a relationship between a first signal and a second signal (block 710). For example, the UE (e.g., using reception component 902 and/or communication manager 906, depicted in FIG. 9) may receive an indication of a relationship between a first signal and a second signal, as described above.

As further shown in FIG. 7, in some aspects, process 700 may include communicating with a wireless communication device based at least in part on using a first transmission configuration for the first signal, the first transmission configuration specifying that the first signal includes a GI that spans a duration and is based at least in part on a delay spread of the first signal (block 720). For example, the UE (e.g., using reception component 902, transmission component 904, and/or communication manager 906, depicted in FIG. 9) may communicate with a wireless communication device based at least in part on using a first transmission configuration for the first signal, the first transmission configuration specifying that the first signal includes a GI that spans a duration and is based at least in part on a delay spread of the first signal, as described above.

As further shown in FIG. 7, in some aspects, process 700 may include communicating with the wireless communication device based at least in part on using a second transmission configuration for the second signal, the second transmission configuration specifying that the second signal includes the GI based at least in part on the indication of the relationship (block 730). For example, the UE (e.g., using reception component 902, transmission component 904, and/or communication manager 906, depicted in FIG. 9) may communicate with the wireless communication device based at least in part on using a second transmission configuration for the second signal, the second transmission configuration specifying that the second signal includes the GI based at least in part on the indication of the relationship, as described above.

Process 700 may include additional aspects, such as any single aspect or any combination of aspects described below and/or in connection with one or more other processes described elsewhere herein.

In a first aspect, the indication of the relationship is a first indication, and receiving the indication of the relationship between the first signal and the second signal includes receiving a second indication of the first transmission configuration, receiving a third indication of the second transmission configuration, determining that the first transmission configuration and the second transmission configuration each specify the GI, and determining the relationship between the first signal and the second signal is a quasi-co-located relationship based at least in part on determining that the first transmission configuration and the second transmission configuration each specify the GI.

In a second aspect, process 700 includes calculating the delay spread based at least in part on receiving the first signal, and processing the second signal using the delay spread based at least in part on the relationship.

In a third aspect, receiving the indication of the relationship between the first signal and the second signal includes receiving TCI state information that specifies, as the relationship, a QCL relationship between the first signal and the second signal.

In a fourth aspect, process 700 includes deriving that the second transmission configuration specifies that the second signal includes the GI and the delay spread of the first signal based at least in part on the QCL relationship between the first signal and the second signal.

In a fifth aspect, the TCI state information specifies that the QCL relationship between the first signal and the second signal includes at least one of a delay spread QCL relationship, or a GI QCL relationship.

In a sixth aspect, process 700 includes receiving updated TCI state information that includes at least one of a first modification to the delay spread of the first signal, or a second modification to the duration of the GI, and communicating with the wireless communication device using the second signal includes communicating with the wireless communication device using the second signal based at least in part on using the updated TCI state information for communicating an entirety of symbols included in the second signal.

In a seventh aspect, the entirety of the symbols includes at least one symbol that does not carry a DMRS.

In an eighth aspect, the updated TCI state information is an update to a single TCI state, and process 700 includes deriving a modified duration for the GI based at least in part on the update to the single TCI state, and using the modified duration for at least one of transmission of one or more uplink signals, or reception of one or more downlink signals.

In a ninth aspect, each uplink signal of the one or more uplink signals is associated with a respective uplink channel.

In a tenth aspect, each downlink signal of the one or more downlink signals is associated with a respective downlink channel.

In an eleventh aspect, the TCI state information indicates that the first signal is a QCL source for the second signal.

In a twelfth aspect, process 700 includes receiving an update to the first transmission configuration of the first signal, the update including a modification to the duration of the GI, and communicating with the wireless communication device using the second signal and the modification to the duration of the GI.

In a thirteenth aspect, the TCI state information indicates a QCL source associated with determining the duration of the GI.

In a fourteenth aspect, process 700 includes receiving an update to the duration of the GI, and autonomously updating the TCI state information based at least in part on the update to the duration of the GI.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
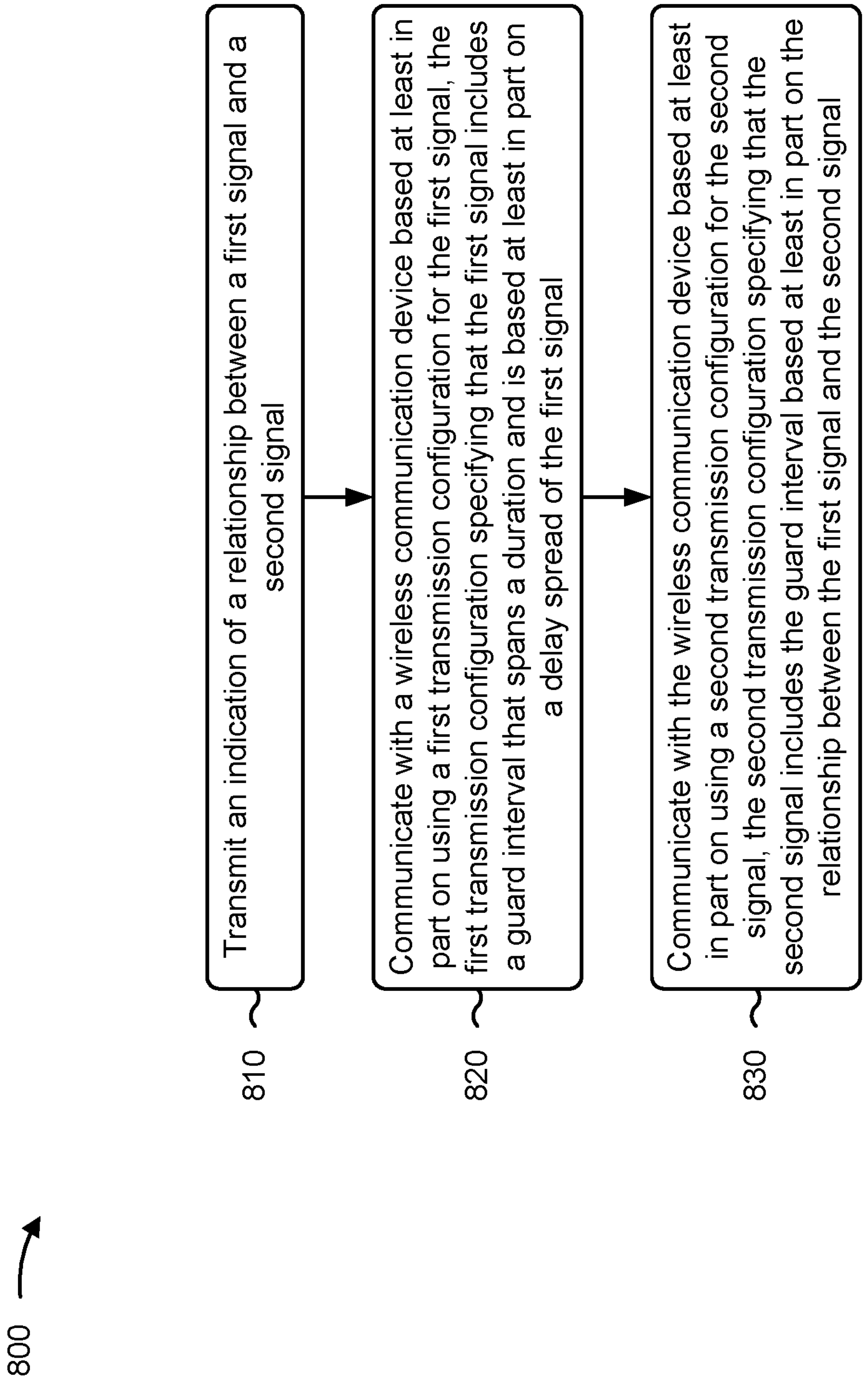
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 110) performs operations associated with a transmission configuration for a second signal based at least in part on a relationship (e.g., a GI linkage) with a first signal.

As shown in FIG. 8, in some aspects, process 800 may include transmitting an indication of a relationship between a first signal and a second signal (block 810). For example, the network node (e.g., using transmission component 1004 and/or communication manager 1006, depicted in FIG. 10) may transmit an indication of a relationship between a first signal and a second signal, as described above.

As further shown in FIG. 8, in some aspects, process 800 may include communicating with a wireless communication device based at least in part on using a first transmission configuration for the first signal, the first transmission configuration specifying that the first signal includes a GI that spans a duration and is based at least in part on a delay spread of the first signal (block 820). For example, the network node (e.g., using reception component 1002, transmission component 1004, and/or communication manager 1006, depicted in FIG. 10) may communicate with a wireless communication device based at least in part on using a first transmission configuration for the first signal, the first transmission configuration specifying that the first signal includes a GI that spans a duration and is based at least in part on a delay spread of the first signal, as described above.

As further shown in FIG. 8, in some aspects, process 800 may include communicating with the wireless communication device based at least in part on using a second transmission configuration for the second signal, the second transmission configuration specifying that the second signal includes the GI based at least in part on the relationship between the first signal and the second signal (block 830). For example, the network node (e.g., using reception component 1002, transmission component 1004, and/or communication manager 1006, depicted in FIG. 10) may communicate with the wireless communication device based at least in part on using a second transmission configuration for the second signal, the second transmission configuration specifying that the second signal includes the GI based at least in part on the relationship between the first signal and the second signal, as described above.

Process 800 may include additional aspects, such as any single aspect or any combination of aspects described below and/or in connection with one or more other processes described elsewhere herein.

In a first aspect, the indication of the relationship is a first indication, and transmitting the indication of the relationship between the first signal and the second signal includes transmitting a second indication of the first transmission configuration that specifics the first signal includes the GI, and transmitting a third indication of the second transmission configuration that specifies the second signal includes the GI.

In a second aspect, transmitting the indication of the relationship between the first signal and the second signal includes transmitting TCI state information that specifies, as the relationship, a QCL relationship between the first signal and the second signal.

In a third aspect, the TCI state information specifies that the QCL relationship between the first signal and the second signal includes at least one of a delay spread QCL relationship, or a GI QCL relationship.

In a fourth aspect, process 800 includes transmitting updated TCI state information that includes at least one of a first modification to the delay spread of the first signal, or a second modification to the duration of the GI, and communicating with the wireless communication device using the second signal includes communicating with the wireless communication device using the second signal based at least in part on using the updated TCI information for communicating an entirety of symbols included in the second signal.

In a fifth aspect, the entirety of the symbols includes at least one symbol that does not carry a DMRS.

In a sixth aspect, the updated TCI state information is an update to a single TCI state, and process 800 includes indicating a modified duration to the GI based at least in part on the update to the single TCI state, and using the modified duration for at least one of reception of one or more uplink signals, or transmission of one or more downlink signals.

In a seventh aspect, each uplink signal of the one or more uplink signals is associated with a respective uplink channel.

In an eighth aspect, each downlink signal of the one or more downlink signals is associated with a respective downlink channel.

In a ninth aspect, the TCI state information indicates that the first signal is a QCL source for the second signal.

In a tenth aspect, process 800 includes transmitting an update to the first transmission configuration of the first signal, the update including a modification to the duration of the GI, and communicating with the wireless communication device using the second signal and the modification to the duration of the GI.

In an eleventh aspect, the TCI state information indicates a QCL source associated with determining the duration of the GI.

In a twelfth aspect, process 800 includes indicating updated TCI state information based at least in part on transmitting an update to the duration of the GI.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
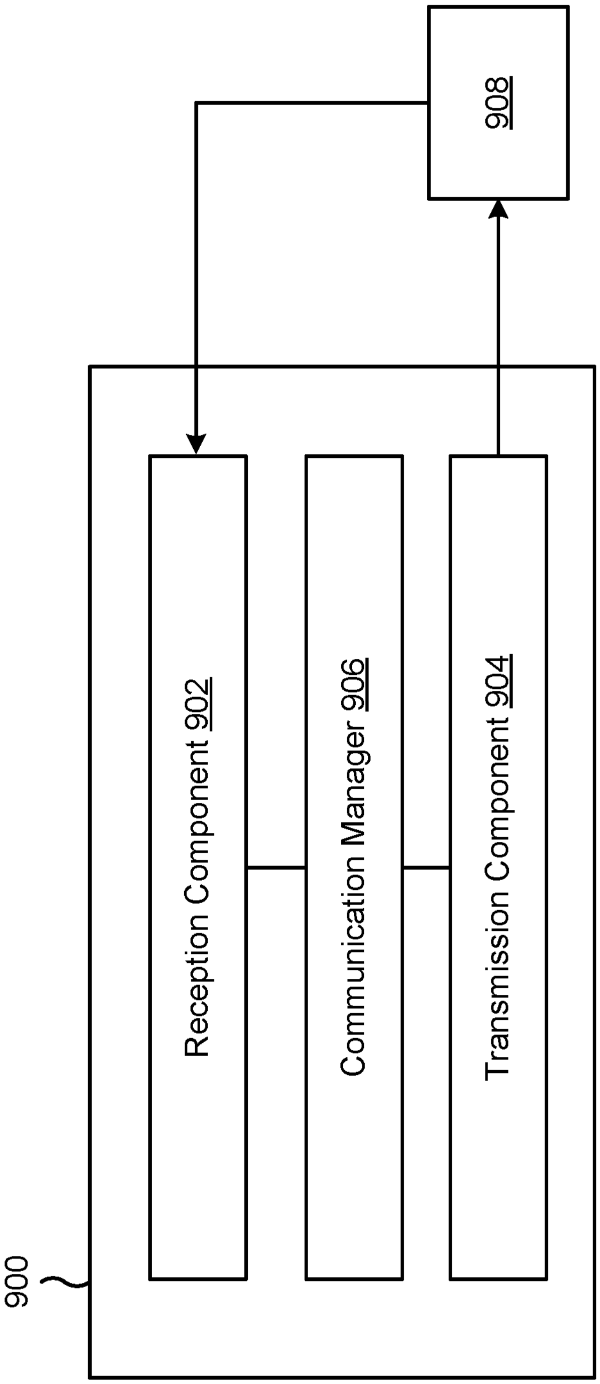
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 4-8. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive an indication of a relationship between a first signal and a second signal. The reception component 902 and/or the transmission component 904 may communicate with a wireless communication device based at least in part on using a first transmission configuration for the first signal, the first transmission configuration specifying that the first signal includes a GI that spans a duration and is based at least in part on a delay spread of the first signal. The reception component 902 and/or the transmission component 904 may communicate with the wireless communication device based at least in part on using a second transmission configuration for the second signal, the second transmission configuration specifying that the second signal includes the GI based at least in part on the indication of the relationship.

The communication manager 906 may calculate the delay spread based at least in part on receiving the first signal.

The communication manager 906 may process the second signal using the delay spread based at least in part on the relationship.

The communication manager 906 may derive that the second transmission configuration specifies that the second signal includes the GI and the delay spread of the first signal based at least in part on the QCL relationship between the first signal and the second signal.

The reception component 902 may receive updated TCI state information that includes at least one of a first modification to the delay spread of the first signal, or a second modification to the duration of the GI.

The reception component 902 may receive an update to the first transmission configuration of the first signal, the update including a modification to the duration of the GI.

The communication manager 906 may communicate with the wireless communication device using the second signal and the modification to the duration of the GI.

The reception component 902 may receive an update to the duration of the GI.

The communication manager 906 may autonomously update the TCI state information based at least in part on the update to the duration of the GI.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
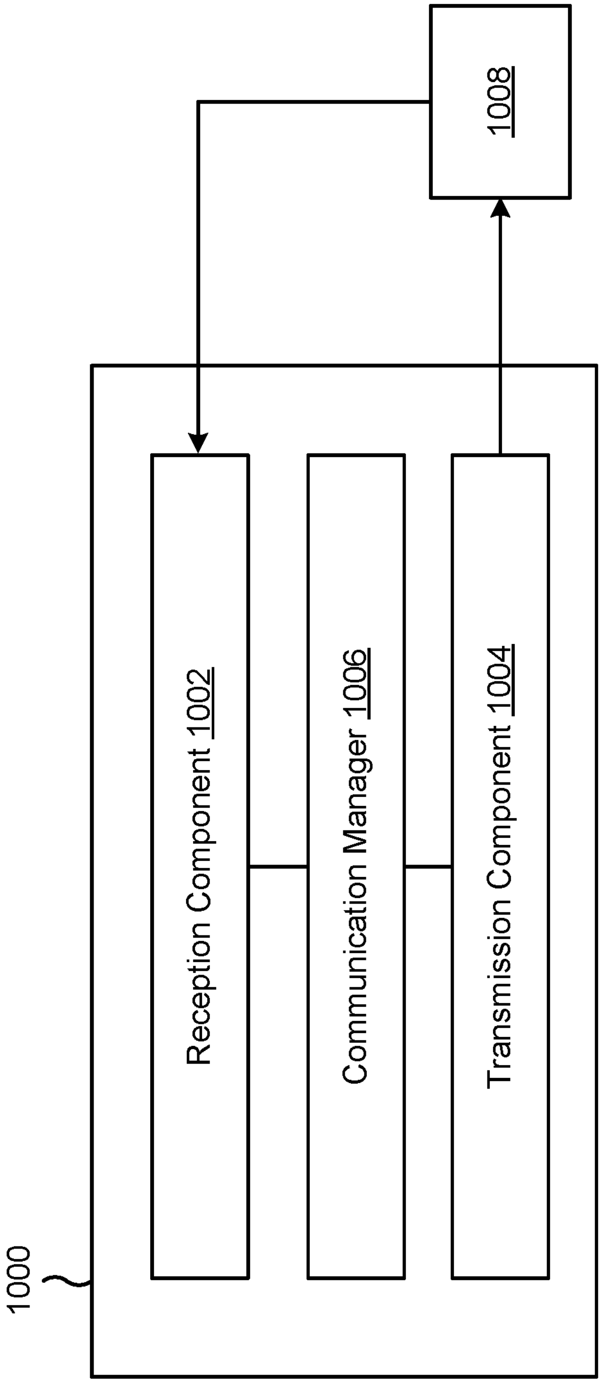
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 4-8. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The transmission component 1004 may transmit an indication of a relationship between a first signal and a second signal. The reception component 1002 and/or the transmission component 1004 may communicate with a wireless communication device based at least in part on using a first transmission configuration for the first signal, the first transmission configuration specifying that the first signal includes a GI that spans a duration and is based at least in part on a delay spread of the first signal. The reception component 1002 and/or the transmission component 1004 may communicate with the wireless communication device based at least in part on using a second transmission configuration for the second signal, the second transmission configuration specifying that the second signal includes the GI based at least in part on the relationship between the first signal and the second signal.

The transmission component 1004 may transmit updated TCI state information that includes at least one of a first modification to the delay spread of the first signal, or a second modification to the duration of the GI.

The transmission component 1004 may transmit an update to the first transmission configuration of the first signal, the update including a modification to the duration of the GI.

The communication manager 1006 may communicate with the wireless communication device using the second signal and the modification to the duration of the GI.

The communication manager 1006 may indicate updated TCI state information based at least in part on transmitting an update to the duration of the GI.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: receiving an indication of a relationship between a first signal and a second signal; communicating with a wireless communication device based at least in part on using a first transmission configuration for the first signal, the first transmission configuration specifying that the first signal includes a guard interval that spans a duration and is based at least in part on a delay spread of the first signal; and communicating with the wireless communication device based at least in part on using a second transmission configuration for the second signal, the second transmission configuration specifying that the second signal includes the guard interval based at least in part on the indication of the relationship.

Aspect 2: The method of Aspect 1, wherein the indication of the relationship is a first indication, and wherein receiving the indication of the relationship between the first signal and the second signal includes: receiving a second indication of the first transmission configuration; receiving a third indication of the second transmission configuration; determining that the first transmission configuration and the second transmission configuration each specify the guard interval; and determining the relationship between the first signal and the second signal is a quasi-co-located relationship based at least in part on determining that the first transmission configuration and the second transmission configuration each specify the guard interval.

Aspect 3: The method of Aspect 2, further including: calculating the delay spread based at least in part on receiving the first signal; and processing the second signal using the delay spread based at least in part on the relationship.

Aspect 4: The method of any of Aspects 1-3, wherein receiving the indication of the relationship between the first signal and the second signal includes: receiving transmission configuration indicator (TCI) state information that specifies, as the relationship, a quasi-co-located (QCL) relationship between the first signal and the second signal.

Aspect 5: The method of Aspect 4, further including: deriving that the second transmission configuration specifies that the second signal includes the guard interval and the delay spread of the first signal based at least in part on the QCL relationship between the first signal and the second signal.

Aspect 6: The method of Aspect 4, wherein the TCI state information specifies that the QCL relationship between the first signal and the second signal includes at least one of: a delay spread QCL relationship, or a guard interval QCL relationship.

Aspect 7: The method of Aspect 6, further including: receiving updated TCI state information that includes at least one of: a first modification to the delay spread of the first signal, or a second modification to the duration of the guard interval, and wherein communicating with the wireless communication device using the second signal includes: communicating with the wireless communication device using the second signal based at least in part on using the updated TCI state information for communicating an entirety of symbols included in the second signal, and communicating with the wireless communication device using the second signal includes: communicating with the wireless communication device using the second signal based at least in part on using the updated TCI state information for communicating an entirety of symbols included in the second signal.

Aspect 8: The method of Aspect 7, wherein the entirety of the symbols includes at least one symbol that does not carry a demodulation reference signal (DMRS).

Aspect 9: The method of Aspect 7, wherein the updated TCI state information is an update to a single TCI state, and the method further includes: deriving a modified duration for the guard interval based at least in part on the update to the single TCI state; and using the modified duration for at least one of: transmission of one or more uplink signals, or reception of one or more downlink signals.

Aspect 10: The method of Aspect 9, wherein each uplink signal of the one or more uplink signals is associated with a respective uplink channel.

Aspect 11: The method of Aspect 9, wherein each downlink signal of the one or more downlink signals is associated with a respective downlink channel.

Aspect 12: The method of Aspect 4, wherein the TCI state information indicates that the first signal is a QCL source for the second signal.

Aspect 13: The method of Aspect 12, further including: receiving an update to the first transmission configuration of the first signal, the update including a modification to the duration of the guard interval; and communicating with the wireless communication device using the second signal and the modification to the duration of the guard interval.

Aspect 14: The method of Aspect 4, wherein the TCI state information indicates a QCL source associated with determining the duration of the guard interval.

Aspect 15: The method of Aspect 4, further including: receiving an update to the duration of the guard interval; and autonomously updating the TCI state information based at least in part on the update to the duration of the guard interval.

Aspect 16: A method of wireless communication performed by a network node, comprising: transmitting an indication of a relationship between a first signal and a second signal; communicating with a wireless communication device based at least in part on using a first transmission configuration for the first signal, the first transmission configuration specifying that the first signal includes a guard interval that spans a duration and is based at least in part on a delay spread of the first signal; and communicating with the wireless communication device based at least in part on using a second transmission configuration for the second signal, the second transmission configuration specifying that the second signal includes the guard interval based at least in part on the relationship between the first signal and the second signal.

Aspect 17: The method of Aspect 16, wherein the indication of the relationship is a first indication, and wherein transmitting the indication of the relationship between the first signal and the second signal includes: transmitting a second indication of the first transmission configuration that specifies the first signal includes the guard interval; and transmitting a third indication of the second transmission configuration that specifies the second signal includes the guard interval.

Aspect 18: The method of any of Aspects 16-17, wherein transmitting the indication of the relationship between the first signal and the second signal includes: transmitting transmission configuration indicator (TCI) state information that specifies, as the relationship, a quasi-co-located (QCL) relationship between the first signal and the second signal.

Aspect 19: The method of Aspect 18, wherein the TCI state information specifies that the QCL relationship between the first signal and the second signal includes at least one of: a delay spread QCL relationship, or a guard interval QCL relationship.

Aspect 20: The method of Aspect 19, further including: transmitting updated TCI state information that includes at least one of: a first modification to the delay spread of the first signal, or a second modification to the duration of the guard interval, and wherein communicating with the wireless communication device using the second signal includes: communicating with the wireless communication device using the second signal based at least in part on using the updated TCI information for communicating an entirety of symbols included in the second signal, wherein communicating with the wireless communication device using the second signal includes: communicating with the wireless communication device using the second signal based at least in part on using the updated TCI information for communicating an entirety of symbols included in the second signal.

Aspect 21: The method of Aspect 20, wherein the entirety of the symbols includes at least one symbol that does not carry a demodulation reference signal (DMRS).

Aspect 22: The method of Aspect 20, wherein the updated TCI state information is an update to a single TCI state, and the method further includes: indicating a modified duration to the guard interval based at least in part on the update to the single TCI state; and using the modified duration for at least one of: reception of one or more uplink signals, or transmission of one or more downlink signals.

Aspect 23: The method of Aspect 22, wherein each uplink signal of the one or more uplink signals is associated with a respective uplink channel.

Aspect 24: The method of Aspect 22, wherein each downlink signal of the one or more downlink signals is associated with a respective downlink channel.

Aspect 25: The method of Aspect 18, wherein the TCI state information indicates that the first signal is a QCL source for the second signal.

Aspect 26: The method of Aspect 25, further including: transmitting an update to the first transmission configuration of the first signal, the update including a modification to the duration of the guard interval; and communicating with the wireless communication device using the second signal and the modification to the duration of the guard interval.

Aspect 27: The method of Aspect 18, wherein the TCI state information indicates a QCL source associated with determining the duration of the guard interval.

Aspect 28: The method of Aspect 18, further including: indicating updated TCI state information based at least in part on transmitting an update to the duration of the guard interval.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled to the one or more memories, configured to:

receive an indication of a relationship between a first signal and a second signal;

communicate with a wireless communication device based at least in part on using a first transmission configuration for the first signal, the first transmission configuration specifying that the first signal includes a guard interval that spans a duration, wherein the duration for the guard interval is based at least in part on a delay spread of the first signal; and communicate with the wireless communication device based at least in part on using a second transmission configuration for the second signal, the second transmission configuration specifying, based at least in part on the indication of the relationship, that the second signal includes the guard interval having a same duration as included in the first signal.

2. The apparatus of claim 1, wherein the indication of the relationship is a first indication, and wherein the one or more processors, to receive the indication of the relationship between the first signal and the second signal, are configured to:

receive a second indication of the first transmission configuration;

receive a third indication of the second transmission configuration;

determine that the first transmission configuration and the second transmission configuration each specify the guard interval; and determine the relationship between the first signal and the second signal is a quasi-co-located relationship based at least in part on determining that the first transmission configuration and the second transmission configuration each specify the guard interval.

3. The apparatus of claim 2, further including:

calculate the delay spread based at least in part on receiving the first signal; and process the second signal using the delay spread based at least in part on the relationship.

4. The apparatus of claim 1, wherein the one or more processors, to receive the indication of the relationship between the first signal and the second signal, are configured to:

receive transmission configuration indicator (TCI) state information that specifies, as the relationship, a quasi-co-located (QCL) relationship between the first signal and the second signal.

5. The apparatus of claim 4, further including:

derive that the second transmission configuration specifies that the second signal includes the guard interval and the delay spread of the first signal based at least in part on the QCL relationship between the first signal and the second signal.

6. The apparatus of claim 4, wherein the TCI state information specifies that the QCL relationship between the first signal and the second signal includes a guard interval QCL relationship.

7. The apparatus of claim 6, further including:

receive updated TCI state information that includes at least one of:

a first modification to the delay spread of the first signal, or a second modification to the duration of the guard interval, and wherein the one or more processors, to communicate with the wireless communication device using the second signal, are configured to:

communicate with the wireless communication device using the second signal based at least in part on using the updated TCI state information for communicating an entirety of symbols included in the second signal.

8. The apparatus of claim 7, wherein the entirety of the symbols includes at least one symbol that does not carry a demodulation reference signal (DMRS).

9. The apparatus of claim 7, wherein the updated TCI state information is an update to a single TCI state, and wherein the one or more processors are further configured to:

derive a modified duration for the guard interval based at least in part on the update to the single TCI state; and use the modified duration for at least one of:

transmission of one or more uplink signals, or reception of one or more downlink signals.

10. The apparatus of claim 4, wherein the TCI state information indicates that the first signal is a QCL source for the second signal.

11. The apparatus of claim 4, wherein the TCI state information indicates a QCL source associated with determining the duration of the guard interval.

12. The apparatus of claim 4, further including:

receive an update to the duration of the guard interval; and autonomously update the TCI state information based at least in part on the update to the duration of the guard interval.

13. An apparatus for wireless communication at a network node, comprising:

one or more memories; and one or more processors, coupled to the one or more memories, configured to:

transmit an indication of a relationship between a first signal and a second signal;

communicate with a wireless communication device based at least in part on using a first transmission configuration for the first signal, the first transmission configuration specifying that the first signal includes a guard interval that spans a duration, wherein the duration for the guard interval is based at least in part on a delay spread of the first signal; and communicate with the wireless communication device based at least in part on using a second transmission configuration for the second signal, the second transmission configuration specifying, based at least in part on the relationship between the first signal and the second signal, that the second signal includes the guard interval having a same duration as included in the first signal.

14. The apparatus of claim 13, wherein the indication of the relationship is a first indication, and wherein the one or more processors, to transmit the indication of the relationship between the first signal and the second signal, are configured to:

transmit a second indication of the first transmission configuration that specifies the first signal includes the guard interval; and transmit a third indication of the second transmission configuration that specifies the second signal includes the guard interval.

15. The apparatus of claim 13, wherein the one or more processors, to transmit the indication of the relationship between the first signal and the second signal, are configured to:

transmit transmission configuration indicator (TCI) state information that specifies, as the relationship, a quasi-co-located (QCL) relationship between the first signal and the second signal.

16. The apparatus of claim 15, wherein the TCI state information specifies that the QCL relationship between the first signal and the second signal includes a guard interval QCL relationship.

17. The apparatus of claim 16, wherein the one or more processors are further configured to:

transmit updated TCI state information that is an update to a single TCI state;

indicate a modified duration to the guard interval based at least in part on the update to the single TCI state; and use the modified duration for at least one of:

reception of one or more uplink signals, or transmission of one or more downlink signals.

18. The apparatus of claim 15, wherein the TCI state information indicates that the first signal is a QCL source for the second signal.

19. The apparatus of claim 18, wherein the one or more processors are further configured to:

transmit an update to the first transmission configuration of the first signal, the update including a modification to the duration of the guard interval; and communicate with the wireless communication device using the second signal and the modification to the duration of the guard interval.

20. The apparatus of claim 16, wherein the TCI state information indicates a QCL source associated with determining the duration of the guard interval.

21. The apparatus of claim 16, wherein the one or more processors are further configured to:

indicate updated TCI state information based at least in part on transmitting an update to the duration of the guard interval.

22. A method of wireless communication performed by a UE, comprising:

receiving an indication of a relationship between a first signal and a second signal;

communicating with a wireless communication device based at least in part on using a first transmission configuration for the first signal, the first transmission configuration specifying that the first signal includes a guard interval that spans a duration, wherein the duration for the guard interval is based at least in part on a delay spread of the first signal; and communicating with the wireless communication device based at least in part on using a second transmission configuration for the second signal, the second transmission configuration specifying, based at least in part on the indication of the relationship, that the second signal includes the guard interval, having a same duration as included in the first signal.

23. The method of claim 22, wherein the indication of the relationship is a first indication, and wherein receiving the indication of the relationship between the first signal and the second signal includes:

receiving a second indication of the first transmission configuration;

receiving a third indication of the second transmission configuration;

determining that the first transmission configuration and the second transmission configuration each specify the guard interval; and determining the relationship between the first signal and the second signal is a quasi-co-located relationship based at least in part on determining that the first transmission configuration and the second transmission configuration each specify the guard interval.

24. The method of claim 22, wherein receiving the indication of the relationship between the first signal and the second signal includes:

receiving transmission configuration indicator (TCI) state information that specifies, as the relationship, a quasi-co-located (QCL) relationship between the first signal and the second signal.

25. The method of claim 24, further including:

deriving that the second transmission configuration specifies that the second signal includes the guard interval and the delay spread of the first signal based at least in part on the QCL relationship between the first signal and the second signal.

26. The method of claim 24, wherein the TCI state information specifies that the QCL relationship between the first signal and the second signal includes a guard interval QCL relationship.

27. A method of wireless communication performed by a network node, comprising:

transmitting an indication of a relationship between a first signal and a second signal;

communicating with a wireless communication device based at least in part on using a first transmission configuration for the first signal, the first transmission configuration specifying that the first signal includes a guard interval that spans a duration, wherein the duration for the guard interval is based at least in part on a delay spread of the first signal; and communicating with the wireless communication device based at least in part on using a second transmission configuration for the second signal, the second transmission configuration specifying, based at least in part on the indication of the relationship, that the second signal includes the guard interval having a same duration as included in the first signal.

28. The method of claim 27, wherein the indication of the relationship is a first indication, and wherein transmitting the indication of the relationship between the first signal and the second signal includes:

transmitting a second indication of the first transmission configuration that specifies the first signal includes the guard interval; and transmitting a third indication of the second transmission configuration that specifies the second signal includes the guard interval.

29. The method of claim 27, wherein transmitting the indication of the relationship between the first signal and the second signal includes:

transmitting transmission configuration indicator (TCI) state information that specifies, as the relationship, a quasi-co-located (QCL) relationship between the first signal and the second signal.

30. The method of claim 29, wherein the TCI state information indicates a QCL source associated with determining the duration of the guard interval.

* * * * *